(12) United States Patent
Nieto et al.

(10) Patent No.: US 8,488,719 B2
(45) Date of Patent: Jul. 16, 2013

(54) WIRELESS COMMUNICATIONS DEVICE WITH MULTIPLE DEMODULATORS AND RELATED METHODS

(75) Inventors: John W. Nieto, Rochester, NY (US); William N. Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 109 days.

(21) Appl. No.: 12/855,483

(22) Filed: Aug. 12, 2010

(65) Prior Publication Data

US 2012/0039420 A1 Feb. 16, 2012

(51) Int. Cl.
*H04L 27/06* (2006.01)

(52) U.S. Cl.
USPC ............ 375/316; 375/274; 375/324; 375/340

(58) Field of Classification Search
USPC .................................. 375/316, 340, 274, 324
See application file for complete search history.

(56) References Cited

U.S. PATENT DOCUMENTS

| | | | |
|---|---|---|---|
| 5,283,531 A | 2/1994 | Serizawa et al. | 329/316 |
| 5,654,979 A | 8/1997 | Levin et al. | 375/206 |
| 5,832,026 A * | 11/1998 | Li | 375/136 |
| 6,532,222 B1 | 3/2003 | Rege et al. | 370/335 |
| 6,744,809 B2 | 6/2004 | Lomp et al. | 375/149 |
| 6,877,132 B1 | 4/2005 | De et al. | 714/795 |
| 7,599,451 B2 * | 10/2009 | May | 375/340 |
| 7,660,338 B2 | 2/2010 | Smith et al. | 375/131 |
| 7,796,688 B2 * | 9/2010 | Su | 375/232 |
| 2009/0290627 A1 | 11/2009 | Higuchi et al. | 375/224 |

* cited by examiner

*Primary Examiner* — Chieh M Fan
*Assistant Examiner* — Freshteh N Aghdam
(74) *Attorney, Agent, or Firm* — Allen, Dyer, Doppelt, Milbrath & Gilchrist, P.A.

(57) ABSTRACT

A wireless communications device may be configured to perform a first demodulation based upon a first sampling rate of a received signal to generate a first demodulated signal and determine therefrom whether a first error value is not greater than a first threshold, and, if so then decode the first demodulated signal. If the first error value is greater than the first threshold, a second demodulation is performed based upon a second sampling rate of the received signal greater than or equal to the first sampling rate to generate a second demodulated signal and determine therefrom whether a second error value is not greater than a second threshold, and, if so, then decode the second demodulated signal. If the second error value is greater than the second threshold, the second demodulation is performed at least one additional time with at least one change thereto.

17 Claims, 6 Drawing Sheets

WIRELESS COMMUNICATIONS DEVICE WITH MULTIPLE DEMODULATORS AND RELATED METHODS

FIELD OF THE INVENTION

The present invention relates to the field of wireless communications, and, more particularly, to demodulation of signals with multipath characteristics and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

One form of interference that the wireless communications device may encounter is multipath interference. Multipath interference occurs when multiple signals of the same transmission arrive at the receiver wireless communications device, each signal traveling via a different path. The typical causes of multipath interference include, for example, atmospheric ducting, ionospheric reflection and refraction, and reflection from water bodies and terrestrial objects, such as mountains and buildings.

More specifically, when two wireless communications devices communicate over hilly terrain, the resulting multipath interference may be problematic. In some applications, for example, voice communications, the multipath interference may prevent successful communications.

One approach to a wireless communication system is the OpenSky communication system, as available from the Harris. Corporation of Melbourne, Fla., the assignee of the present application. In particular, the OpenSky wireless communication system may provide digital voice transport to radio communications applications and devices, i.e. handsets. As will be appreciated by those skilled in the art, the OpenSky communication system uses a Reed Solomon (RS) code to protect time division multiple access (TDMA) slots or bursts. In fading multipath applications, for example, the hilly terrain (HT) channel (two fading paths 13 µs apart with each path having a 40 Hz Doppler spread and where the power of the second path is 8.6 dB lower than the first path), the OpenSky communication system may suffer from block error rates that prevent successful digital voice communications.

An approach to mitigating multipath effects in a code division multiple access (CDMA) spread spectrum wireless communication system is disclosed in U.S. Pat. No. 5,654,979 to Levin et al. In this approach, the receiver device includes a plurality of parallel demodulators that track respective multipath signals. Each demodulator applies the same algorithm to each multipath element found and then combines all the demodulated results into one result prior to decoding. The receiver device searches for the most powerful multipath signals and assigns demodulators based upon a stored algorithm. In other words, this approach simply applies a standard rake receiver in a parallel manner.

SUMMARY OF THE INVENTION

In view of the foregoing background, it is therefore an object of the present invention to provide a wireless communications device that can readily demodulate received signals with multipath.

This and other objects, features, and advantages in accordance with the present invention are provided by a wireless communications device that includes a receiver, and a processor coupled to the receiver. The processor is configured to perform a first demodulation based upon a first sampling rate of a received signal to generate a first demodulated signal and determine therefrom whether a first error value is not greater than a first threshold, and, if so then decode the first demodulated signal. If the first error value is greater than the first threshold, the processor is then configured to perform a second demodulation based upon a second sampling rate of the received signal that is equal to or greater than the first sampling rate to generate a second demodulated signal and determine therefrom whether a second error value is not greater than a second threshold, and, if so, then decode the second demodulated signal. If the second error value is greater than the second threshold, the processor is configured to then perform the second demodulation at least one additional time with at least one change thereto.

Advantageously, the processor sequentially makes use of the most effective demodulator algorithm for a given received signal with multipath characteristics, and unlike the typical device, the processor applies different demodulators in parallel.

Moreover, if at least one subsequent second error value for the at least one additional performance of the second demodulation is greater than the second threshold, the processor may be configured to then add pseudo-random multipath characteristics to the received signal and perform the second demodulation.

Another aspect is directed to a method of operating a wireless communications device comprising a receiver and a processor coupled to the receiver. The method comprises using the processor to perform a first demodulation based upon a first sampling rate of a received signal to generate a first demodulated signal and determine therefrom whether a first error value is not greater than a first threshold, and, if so then decode the first demodulated signal. The method also comprises if the first error value is greater than the first threshold, then using the processor to perform a second demodulation based upon a second sampling rate of the received signal that is the same or greater than the first sampling rate to generate a second demodulated signal and determine therefrom whether a second error value is not greater than a second threshold, and, if so, then using the processor to decode the second demodulated signal. The method further comprises if the second error value is greater than the second threshold, then using the processor to perform the second demodulation at least one additional time with at least one change thereto.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
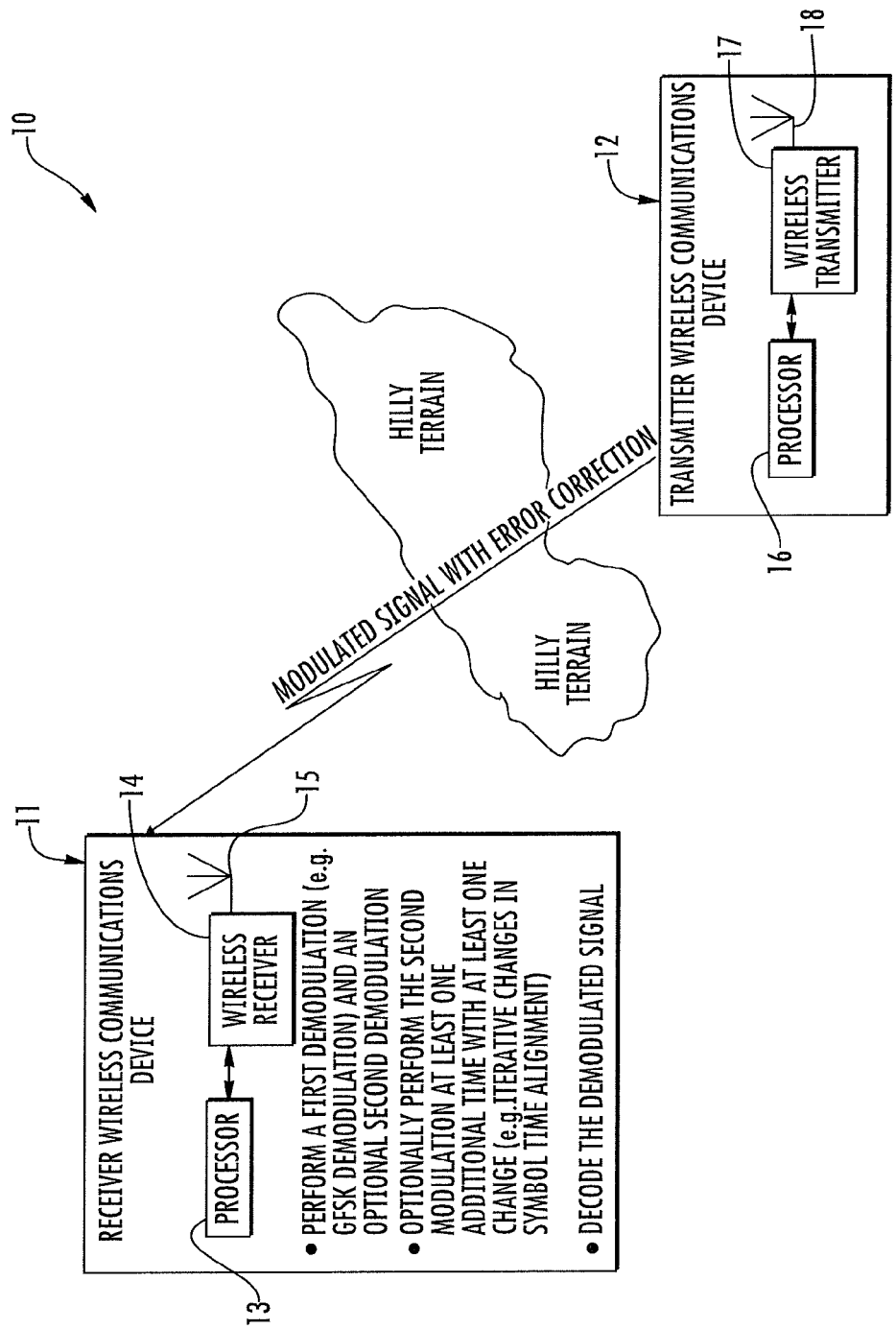
FIG. 1 is a schematic block diagram of a wireless communication system, according to the present invention.
Figure 2:
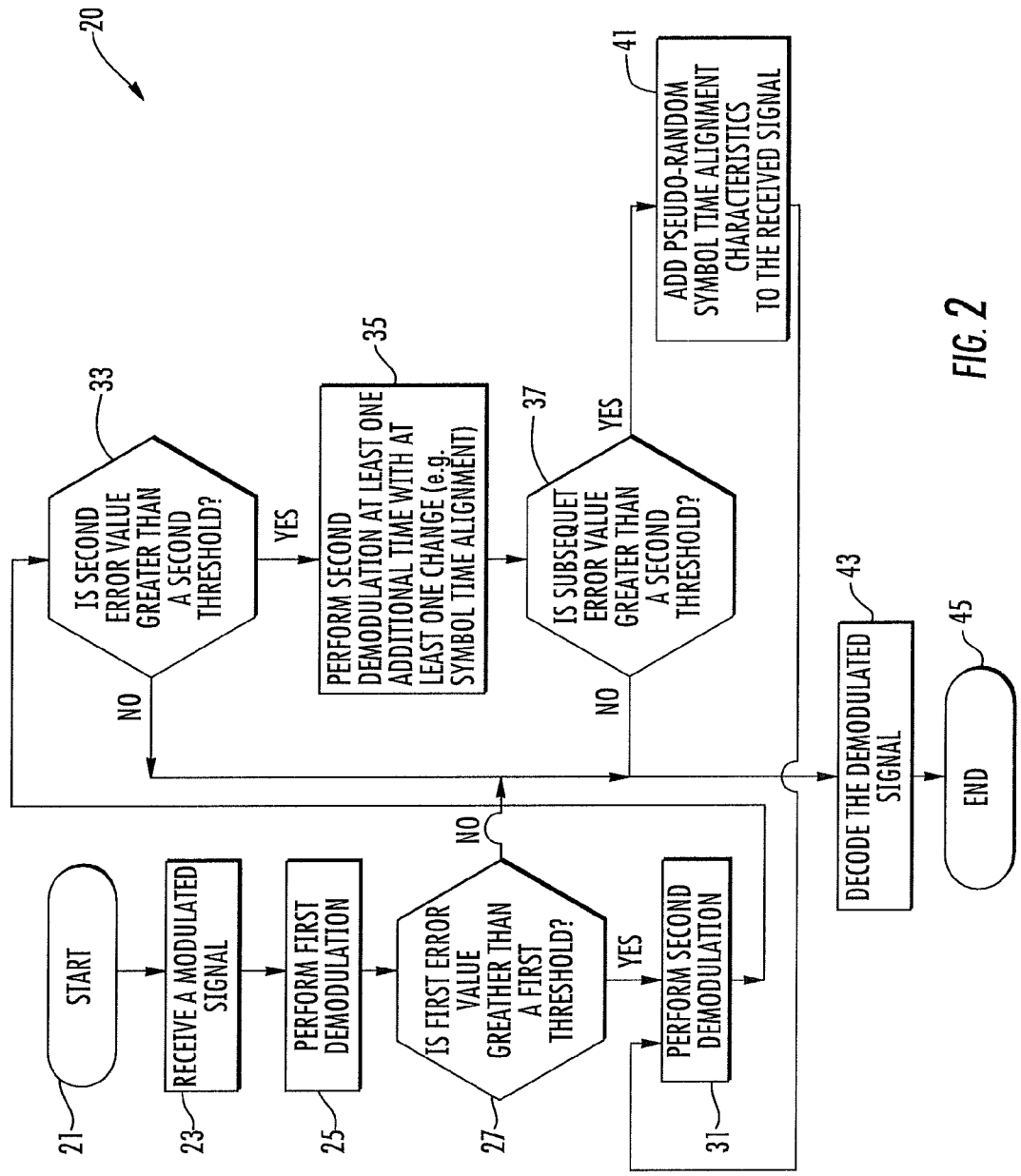
FIG. 2 is a flowchart illustrating operation of the receiver wireless communications device of FIG. 1.

Referring initially to FIGS. 1-2, a wireless communication system 10 according to the present invention is now described. On FIG. 2, a flowchart 20 illustrates a method of operation of a receiver wireless communications device 11, which begins at Block 21. Referring now back to FIG. 1, the wireless communications system 10 illustratively includes the receiver wireless communications device 11, and a transmitter wireless communications device 12 communicating therewith. The receiver wireless communications device 11 illustratively includes an antenna 15, a receiver 14 coupled to the antenna, and a processor 13 coupled to the receiver. The transmitter wireless communications device 12 illustratively includes an antenna 18, a transmitter 17 coupled to the antenna, and a processor 16 coupled to the transmitter. As will be appreciated by those skilled in the art, the wireless communications devices 11, 12 may include a plurality of differing types of wireless communications devices modified according to the teachings herein, for example, the Falcon® III/117G manpack radio, or SBR/SPR handheld radio, as available from the Harris Corporation of Melbourne, Fla., the assignee of the present application.

The wireless communication system 10 illustratively uses a communication protocol including a form of error correction. For example, the communication protocol may include a Gaussian Frequency-Shift Keying (GFSK) modulation waveform with forward error correction (FEC). In particular, the error correction may, for example, be a Reed Solomon (RS) code, a low-density parity-check (LDPC) code, and/or a cyclic redundancy check (CRC) code. For example, the communication protocol may be based upon time division multiple access (TDMA) and be adapted for burst slotted TDMA communications.

As illustrated, the transmitter wireless communications device 12 transmits a modulated signal to the receiver wireless communications device 11. The modulated signal illustratively crosses hilly terrain, which would create multipath propagation. In other words, the receiver wireless communications device 11 will experience multipath effects when the modulated signal is received (Block 23). Of course, the hilly terrain is illustrative, the receiver wireless communications device 11 would be effective for receipt of a transmission through any physical medium that would create multipath propagation, such as an urban environment.

When the modulated signal is received via the antenna 15 and the wireless receiver 14, the processor 13 is configured to perform a first demodulation based upon a first sampling rate of a received signal to generate a first demodulated signal (Block 25). For example, the first demodulator may comprise a typical Gaussian Frequency-Shift Keying (GFSK) demodulator (which could comprise a FM (Frequency Modulation) demodulator followed by a direct current (DC) offset eliminator followed by a symbol-timing loop and a simple linear equalizer), and the first sampling rate may be 2 samples per data symbol.

At decision Block 27, the processor 13 illustratively determines whether a first error value for the first demodulated signal is or is not greater than a first threshold. For example, the first threshold may be zero, i.e. demanding an error free transmission, or some other value, such as an error value threshold suitable for voice communications. If the first error value from the first demodulated signal is not greater than a first threshold, the processor 13 then decodes the first demodulated signal (Blocks 43, 45).

On the other hand, if the processor 13 determines that the first error value is greater than the first threshold, the processor is configured to perform a second (enhanced) demodulation based upon a second sampling rate of the received signal that is the same or greater than the first sampling rate to generate a second demodulated signal (Block 31). Specifically, the processor 13 may interpolate the received signal to 16 samples per data symbol, for example. Further, the processor 13 is configured to perform the second demodulation, which may include performing a FM demodulation, processing for a DC offset downstream from the FM demodulation, i.e. frequency error removal, applying at least one matched filter (where each matched filter comprises an integrate and dump over the symbol time minus a hypothesized multipath guard time) downstream from the FM demodulation, and determining symbol timing based on the greater samples per symbol stream and using a different algorithm than the first demodulation.

At decision Block 33, the processor 13 then determines whether a second error value (associated with the second demodulated signal) is or is not greater than a second threshold. In some embodiments, the first and second threshold may be the same value, i.e. equal, but in other embodiments, the threshold values may be tiered. If the processor 13 determines that second error value is not greater than the second threshold, the processor decodes the second demodulated signal (Blocks 43, 45).

If the second error value is greater than the second threshold, the processor 13 is configured to then perform the second demodulation at least one additional time with at least one change thereto (Block 35). More specifically, the at least one change may comprise at least one change in symbol time alignment (for example, in the aforesaid embodiment with 16× oversampling, there are 16 possible symbol time alignments). Further, the processor 13 is configured to perform the second demodulation at least one additional time by applying all the different time alignments to determine a closest match time alignment for the received signal (Block 35). In other words, the processor 13 is configured to apply each of the 16 possible alignments for each matched filter, using adjusted matched filter guard times. In some embodiments, the processor 13 is configured to provide an array of demodulated data symbols based upon the results from the 16 possible time alignments.

Further, the processor 13 is configured to begin the search for the best time alignment with the demodulated symbols with the least amount of mean squared error in the data symbols (relative to closest symbol constellation). The processor 13 is configured to move outward from this time alignment as the search progresses.

For each symbol time alignment tested in the second demodulator, the processor 13 again checks subsequent second error values to determine if they are greater than, equal to, or less than the second threshold. Again, if a subsequent second error value is not greater than the second threshold, the processor 13 proceeds to decode the demodulated signal (Blocks 43, 45). After all time alignments have been tested, if all of the subsequent second error values exceed the second threshold, the processor 13 is configured to then add pseudo-random multipath characteristics (amplitude and phase dither) to the received signal and again perform the second demodulation (Blocks 37, 41). Advantageously, the pseudo-random multipath characteristics help address the undesired tone nulls that may occur with multipath destructive interference in the received signal. Of course, if all of the subsequent second error values (for the multiple demodulated signals in the search space) exceed the second threshold, even with the addition of pseudo-random multipath characteristics, the processor 13 will select the time alignment with the least amount of symbol differences between it and symbols demodulated with adjacent time alignments, thus providing an output stream with a minimum number of errors.

The receiver wireless communications device 11 efficiently and effectively demodulates the multipath received signal. The receiver wireless communications device 11 first applies the quick and efficient (resource consumption) first demodulation, which may be a simple GFSK demodulator. The receiver wireless communications device 11 then only applies an enhanced second demodulation if the first demodulation produces errors. Of course, since the communication protocol has built-in error correction, the receiver wireless communications device 11 may readily determine if there are errors in the demodulated signal. If the first demodulated signal has errors, the receiver wireless communications device 11 then applies the second demodulation, which has significant enhancements over the first, which, of course, come with extra computational costs.

Again, only if the second demodulated signal has unacceptable errors does the receiver wireless communications device 11 apply a search process to the second demodulator. If the demodulated signals from the search process all have unacceptable errors, then the receiver wireless communications device 11 applies pseudo-random multipath characteristics to the received signal. In short, the receiver wireless communications device 11 applies only the minimum demodulator complexity needed to secure a successful demodulation. In other words, if the relatively simple GFSK demodulator can achieve error free operation, the receiver wireless communications device 11 uses only the standard GFSK demodulator, and if a much more robust demodulator is needed for error free demodulation, the receiver wireless communications device 11 applies the appropriate demodulator.

Figure 3:
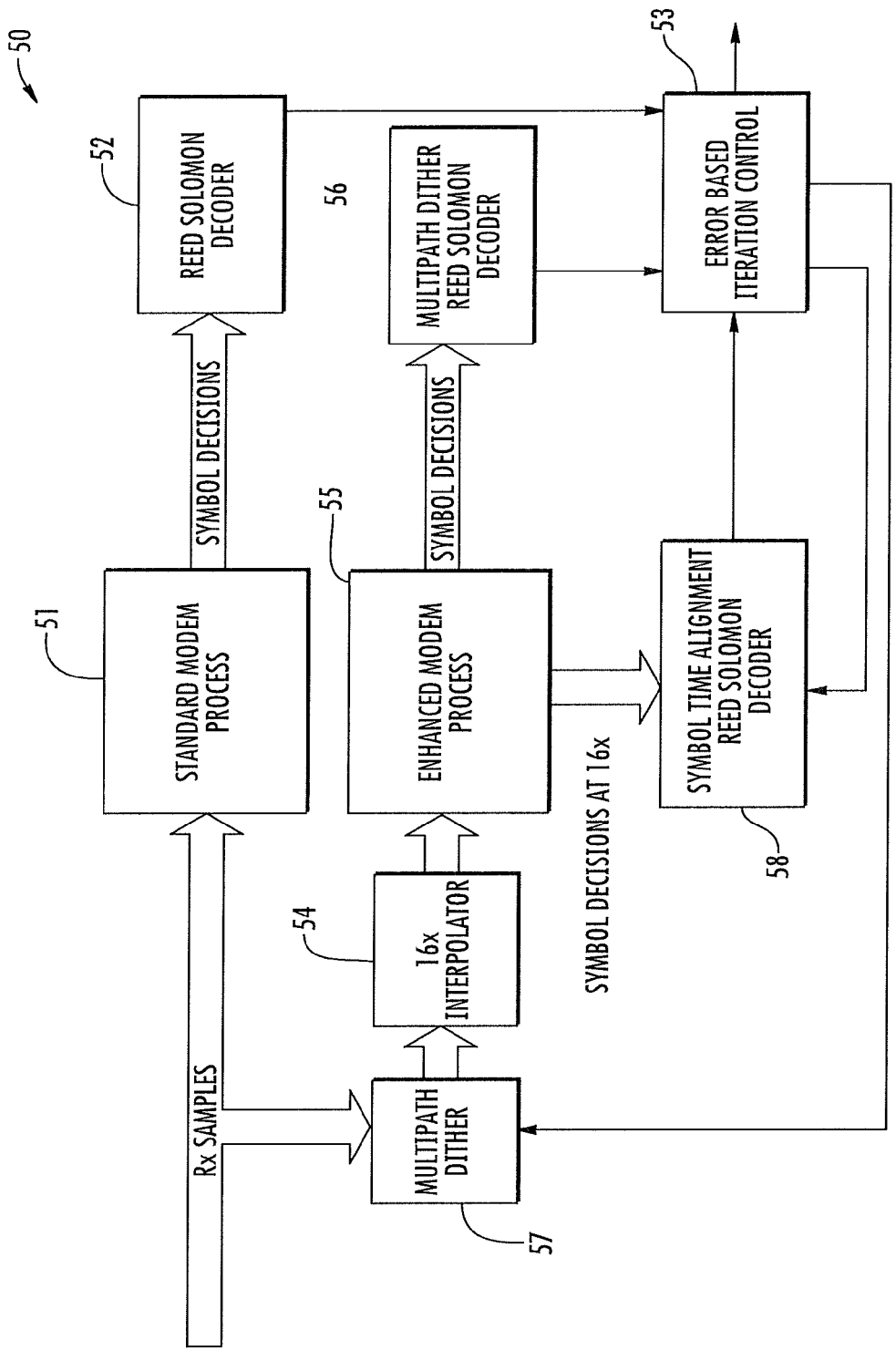
FIG. 3 is a schematic block diagram of another embodiment of the receiver wireless communications device, according to the present invention.

Referring to FIG. 3, an exemplary implementation 50 of the aforementioned receiver wireless communications device 11 is illustrated. This device 50 illustratively includes a standard modem process module 51 receiving samples from a received signal. The standard modem process module 51 demodulates the received signal and provides symbol decisions based upon a standard GFSK demodulator, i.e. a FM demodulation, a DC bias removal processing thereafter, and the application of a symbol timing algorithm and a simple linear equalizer downstream from the DC bias removal processing. The device 50 illustratively includes an RS decoder 52 receiving the symbol decisions, and an error based iteration control module 53 cooperating with the RS decoder. The device 50 illustratively includes a second demodulation path including a multipath dither module 57, a 16× interpolator 54, an enhanced modem module 55, and a multipath dither RS decoder 56 (all coupled in this same order).

If the control module 53 indicates that there are errors in the demodulated signal from the standard modem process module 51, the received signal samples are fed into the second demodulation path for demodulation. If the control module 53 indicates that the demodulated signal from the second demodulation path has errors, the device 50 includes a time alignment RS decoder 58 for decoding the demodulated signal at one or more of the possible symbol time alignments. In other words, the process of the enhanced modem module 55 is applied to all possible 16 symbol time alignments.

Figure 4:
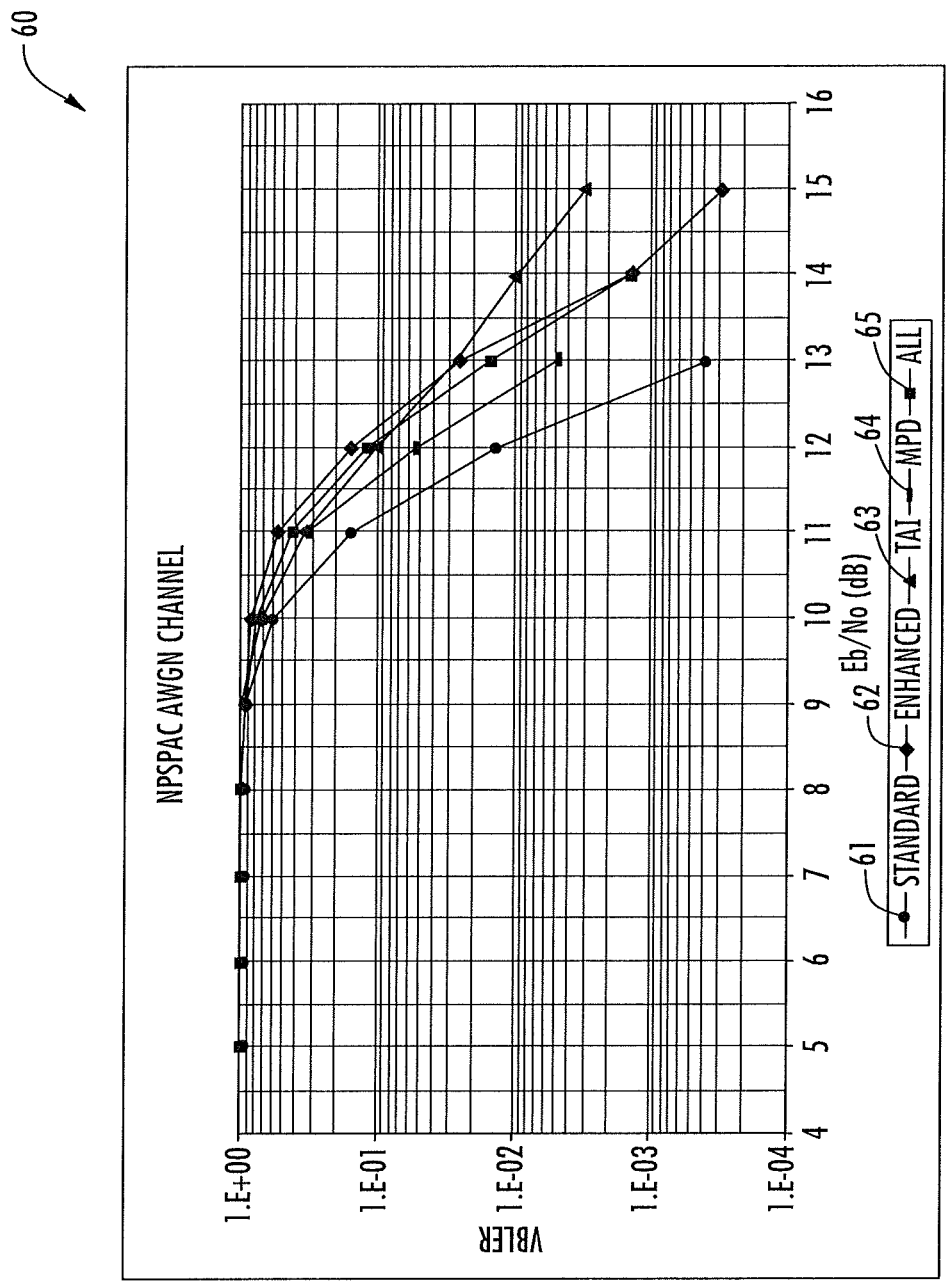
FIGS. 4-6 are charts illustrating performance of the receiver wireless communications device of FIG. 1.
Figure 5:
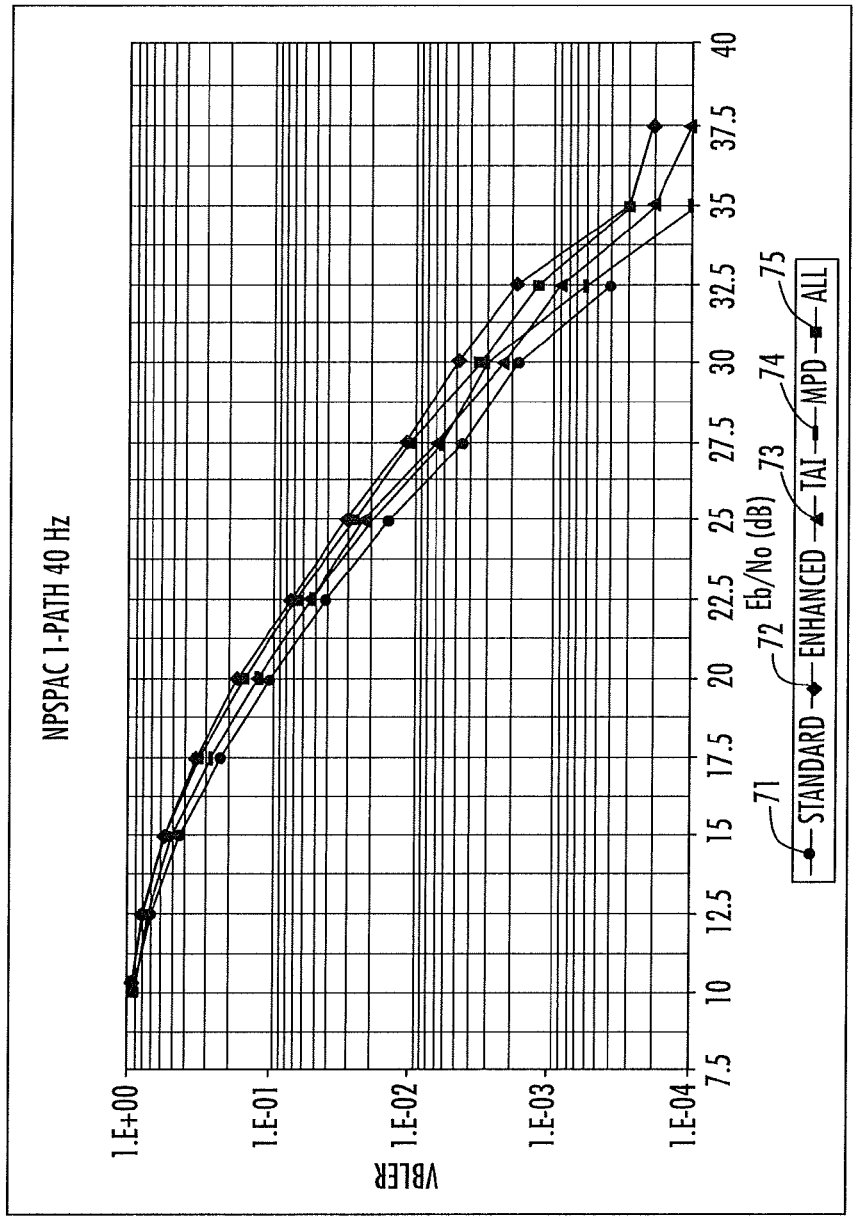
Figure 6:
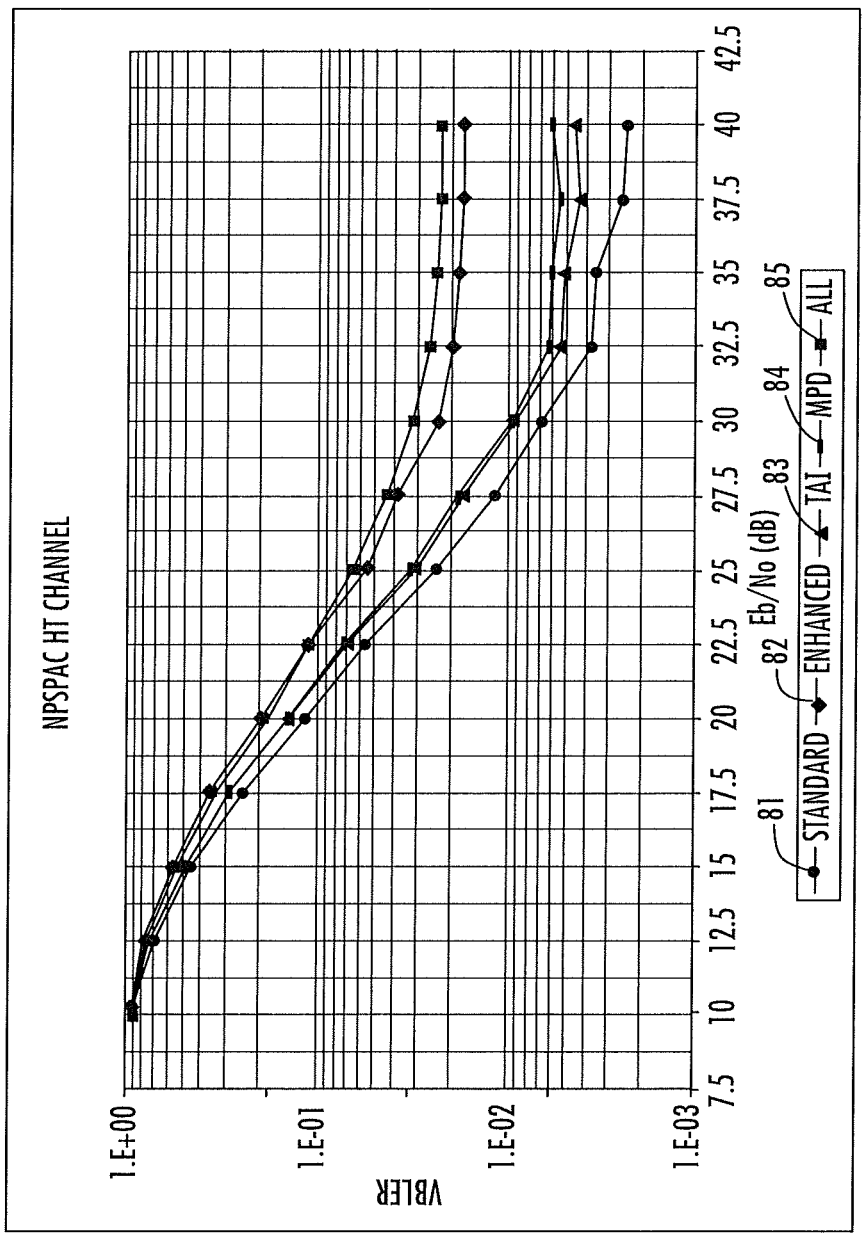

Referring now to FIGS. 4-6, charts 60, 70, 80 illustrate the performance of the receiver wireless communications device 11 in varying transmission channels using a public safety waveform meeting the National Public Safety Planning Advisory Committee (NPSPAC) spectrum requirements. In particular, the first chart 60 plots the receiver wireless communications device's 11 performance on an additive white Gaussian noise channel, the second chart 70 plots the device's performance in a 1-path 40 Hz Doppler spread channel, and the third chart 80 plots the device's performance in a hilly terrain channel. The corresponding plotted curves on each chart relate to performance of particular demodulators, i.e. curves 61, 71, 81 relate to the application of only the first demodulator, curves 62, 72, 82 relate to the application of only the second enhanced demodulator, curves 63, 73, 83 relate to the application of only the second enhanced demodulator using multiple time alignments, and curves 64, 74, 84 relate to the application of only the second enhanced demodulator with pseudo-random multipath characteristics.

As in the receiver wireless communications device 11, curves 65, 75, 85 relate to selective application of all the demodulators (first and second demodulator with multiple time alignment and with pseudo-random multipath characteristics). As shown by the charts 60, 70, 80, the performance of the receiver wireless communications device 11 is superior to the other methods alone by providing a lower voice block error rate (VBLER).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
   a receiver; and
   a processor coupled to said receiver and configured to:
   perform a first demodulation based upon a first sampling rate of a received signal to generate a first demodulated signal and determine therefrom whether a first error value is not greater than a first threshold, and, if so then decode the first demodulated signal,
   if the first error value is greater than the first threshold, then perform a second demodulation based upon a second sampling rate of the received signal greater than the first sampling rate to generate a second demodulated signal and determine therefrom whether a second error value is not greater than a second threshold, and, if so, then decode the second demodulated signal,
   if the second error value is greater than the second threshold, then perform the second demodulation at least one additional time with at least one change thereto, and
   if at least one subsequent second error value for the at least one additional execution of the second demodulation is greater than the second threshold, then add pseudo-random multipath characteristics to the received signal and perform the second demodulation.

2. The wireless communications device according to claim 1 wherein the first and second thresholds are equal.

3. The wireless communications device according to claim 1 wherein said processor is configured to perform the second demodulation to include performing a frequency modulation (FM) demodulation, processing a direct current (DC) offset on the FM demodulation, and applying at least one matched filter downstream from the DC offset.

4. The wireless communications device according to claim 1 wherein said processor is configured to provide an array of demodulated data symbols based upon the second demodulation.

5. The wireless communications device according to claim 1 wherein the first demodulation is a standard Gaussian Frequency-Shift Keying (GFSK) demodulation.

6. The wireless communications device according to claim 1 wherein the received signal comprises a received Reed Solomon (RS) codeword.

7. A wireless communications device comprising:
a receiver; and
a processor coupled to said receiver and configured to:
perform a first demodulation based upon a first sampling rate of a received signal to generate a first demodulated signal and determine therefrom whether a first error value is not greater than a first threshold, and, if so then decode the first demodulated signal,
if the first error value is greater than the first threshold, then perform a second demodulation based upon a second sampling rate of the received signal greater than the first sampling rate to generate a second demodulated signal and determine therefrom whether a second error value is not greater than a second threshold, and, if so, then decode the second demodulated signal,
if the second error value is greater than the second threshold, then perform the second demodulation at least one additional time with at least one change in symbol time alignment thereto, and
if at least one subsequent second error value for the at least one additional execution of the second demodulation is greater than the second threshold, then add pseudo-random multipath characteristics to the received signal and perform the second demodulation.

8. The wireless communications device according to claim 7 wherein said processor is configured to perform the second demodulation at least one additional time by applying different symbol time alignments to determine a closest match symbol time alignment for the received signal.

9. The wireless communications device according to claim 7 wherein the first and second thresholds are equal.

10. The wireless communications device according to claim 7 wherein said processor is configured to perform the second demodulation to include performing a frequency modulation (FM) demodulation, processing a direct current (DC) offset on the FM demodulation, and applying at least one matched filter downstream from the DC offset.

11. The wireless communications device according to claim 7 wherein said processor is configured to provide an array of demodulated data symbols based upon the second demodulation.

12. A method of operating a wireless communications device comprising a receiver and a processor coupled to the receiver, the method comprising:
performing using the processor a first demodulation based upon a first sampling rate of a received signal and generating a first demodulated signal and determining therefrom whether a first error value is not greater than a first threshold, and, if so then decoding the first demodulated signal;
if the first error value is greater than the first threshold, then performing using the processor a second demodulation based upon a second sampling rate of the received signal greater than the first sampling rate and generating a second demodulated signal and determining therefrom whether a second error value is not greater than a second threshold, and, if so, then decoding the second demodulated signal using the processor;
if the second error value is greater than the second threshold, then performing using the processor the second demodulation at least one additional time with at least one change thereto; and
if at least one subsequent second error value for the at least one additional performance of the second demodulation is greater than the second threshold, then adding pseudo-random multipath characteristics to the received signal and performing the second demodulation.

13. The method according to claim 12 wherein the least one change comprises changing the symbol time alignment.

14. The method according to claim 13 further comprising applying different symbol time alignments to determine a closest match symbol time alignment for the received signal when performing the second demodulation at least one additional time using the processor.

15. The method according to claim 12 further comprising setting the first and second threshold to be equal.

16. The method according to claim 12 wherein performing the second demodulation includes performing a frequency modulation (FM) demodulation, processing a direct current (DC) offset on the FM demodulation, and applying at least one matched filter downstream from the DC offset.

17. The method according to claim 12 further comprising providing an array of demodulated data symbols based upon the second demodulation.

* * * * *